United States Patent [19]

Sagane et al.

[11] Patent Number: 5,225,503
[45] Date of Patent: Jul. 6, 1993

[54] PROCESS FOR PREPARING CYCLOOLEFIN RANDOM COPOLYMER

[75] Inventors: Toshihiro Sagane; Hideaki Yamaguchi, both of Waki, Japan

[73] Assignee: Mitsui Petrochemical Industries, Ltd., Tokyo, Japan

[21] Appl. No.: 974,295

[22] Filed: Nov. 10, 1992

[30] Foreign Application Priority Data

Nov. 11, 1991 [JP] Japan ................... 3-294619

[51] Int. Cl.$^5$ .............. C08F 4/68; C08F 232/04; C08F 232/08
[52] U.S. Cl. .................. 526/169.2; 526/136; 526/281; 526/282
[58] Field of Search ........... 526/169.2, 281, 282, 526/283, 136

[56] References Cited

U.S. PATENT DOCUMENTS

| | | | |
|---|---|---|---|
| 4,614,778 | 9/1986 | Kajiura et al. | 526/281 |
| 4,935,475 | 6/1990 | Kishimura et al. | 526/169.2 |
| 5,049,633 | 9/1991 | Sasaki et al. | 526/281 |
| 5,106,931 | 4/1992 | Sagane et al. | 526/282 |

FOREIGN PATENT DOCUMENTS

| | | | |
|---|---|---|---|
| 0203799 | 12/1986 | European Pat. Off. | 526/281 |
| 0325260 | 7/1989 | European Pat. Off. | 526/281 |
| 0358516 | 3/1990 | European Pat. Off. | |
| 0361714 | 4/1990 | European Pat. Off. | |
| 0447072 | 9/1991 | European Pat. Off. | |
| 0446051 | 11/1991 | European Pat. Off. | |
| 4-101586 | 2/1992 | Japan | |
| 1030989 | 5/1966 | United Kingdom | 526/281 |

OTHER PUBLICATIONS 87-304349/43, "Prodn. of Cyclic Olefin random ...", Mitsui Petrochem Ind., Mar. 17, 1986, p. 1.
86-288465/44, "Heat-resistant Random ...", Mitsui Petrochem, Ind., Mar. 18, 1985, p. 1.
86-187071/29, "New Polymer Comprising ...", Mitsui Petrochem Ind., Nov. 19, 1984, p. 1.
91-284772/39, "Prepn. of Cyclic Olefin ...", Mitsui Petrochem Ind., Dec. 15, 1989, p. 1.
91-263132/36, "Prepn. of Cyclic Olefin-contg. random ...", Mitsui Petrochem Ind., Nov. 30, 1989, p. 1.
91-263131/36, "Cyclic Olefin Contg ...", Mitsui Petrochem Ind., Nov. 30, 1989, p. 1.
87-337826/48, "Prodn. of Cyclic Olefin ...", Mitsui Petrochem Ind., Apr. 14, 1986, p. 1.
86-300754/46, "Prepn. of Olefin ...", Mitsui Petrochem Ind., Mar. 26, 1985, p. 1.
86-180848/24, "New Transparent Heat-Resistant ...", Mitsui Petrochem Ind., Dec. 11, 1984, p. 1.

*Primary Examiner*—Fred Teskin
*Attorney, Agent, or Firm*—Sherman and Shalloway

[57] ABSTRACT

The present invention is intended for the preparation of a cycloolefin random copolymer, which is a copolymer of ethylene, cycloolefin and if necessary α-olefin, in a high yield. The process for preparing a cycloolefin random copolymer according to the invention is a process for preparing a cycloolefin random copolymer comprising repeating units derived from (i) ethylene in an amount of 40 to 97% by mol, repeating units derived from (ii) cycloolefin in an amount of 3 to 60% by mol and repeating units derived from (iii) α-olefin of 3–20 carbon atoms in an amount of 0 to 20% by mol, wherein (i) ethylene, (ii) cycloolefin and if necessary (iii) α-olefin of 3–20 carbon atoms are copolymerized in a liquid phase in the presence of a catalyst formed from (A) a soluble vanadium compound having a tertiary alkoxy group or β-diketone as a ligand and (B) an organoaluminum compound represented by the formula (i-Bu)$_n$AlCl$_{3-n}$ wherein n is 1.0 to 2.5.

7 Claims, No Drawings

PROCESS FOR PREPARING CYCLOOLEFIN RANDOM COPOLYMER

FIELD OF THE INVENTION

The present invention relates to a process for preparing a cycloolefin random copolymer, more particularly to a process for preparing a cycloolefin random copolymer by which a cycloolefin random copolymer can be prepared in a high yield using a specific catalyst.

BACKGROUND OF THE INVENTION

Cycloolefin random copolymers obtained by copolymerizing ethylene with specific cycloolefins are well balanced among optical qualities, mechanical properties and thermal properties, and they are used as optical materials such as optical memory disc and optical fiber.

The cycloolefin random copolymers referred to above have been heretofore prepared by copolymerizing ethylene with specific bulky cycloolefin in a hydrocarbon solvent such as toluene, cyclohexane, hexane and heptane or using the cycloolefin itself as a solvent in the presence of a catalyst formed from a soluble vanadium compound and an organoaluminum compound.

For obtaining such copolymers as mentioned above in a high yield, a concentration of the copolymer in the polymerization system is increased, and a viscosity of the polymerization system is also increased, thereby to bring about various problems such that polymerization reaction heat is hardly removed, monomer composition in the system is hardly kept in the uniform state and transportability of a polymerization liquid is reduced. Especially when a copolymer of high molecular weight is intended to be prepared, the viscosity of the polymerization system becomes too high, and hence removal of polymerization reaction heat and keeping of uniformity of the monomer composition become much more difficult. For these reasons, a copolymer of uniform composition, particularly a copolymer of high molecular weight, is hardly prepared in a high yield in the polymerization system of high concentration by the use of conventional techniques.

As one example of methods to solve those problems, there is known a method of raising the polymerization temperature to decrease the viscosity of the polymerization system. However, in the case where a cycloolefin random copolymer is intended to be prepared using a catalyst formed from a soluble vanadium compound and an organoaluminum compound both conventionally used, this method still has such a problem that the catalyst activity generally lowers according to rising of the polymerization temperature.

Accordingly, there has been eagerly desired an advent of a process for preparing a cycloolefin random copolymer in which copolymerization of ethylene and specific bulky cycloolefin can be conducted with high catalyst activity in the polymerization system at a high temperature and at a high polymer concentration, and thereby a cycloolefin random copolymer of uniform composition and high molecular weight can be prepared in a high yield.

In the light of the above-mentioned conventional techniques, the present inventors have earnestly studied on a process for preparing a cycloolefin random copolymer. As a result, they have found that a cycloolefin random copolymer can be obtained in a high yield by a process of copolymerizing ethylene and specific bulky cycloolefin in the presence of a specific catalyst and that the catalyst activity has small temperature dependence, and accomplished the present invention.

OBJECT OF THE INVENTION

It is an object of the present invention to provide a process for preparing a cycloolefin random copolymer of ethylene and cycloolefin by which the cycloolefin random copolymer can be prepared in a high yield.

SUMMARY OF THE INVENTION

The process for preparing a cycloolefin random copolymer according to the present invention is characterized in that said process comprises:

copolymerizing (i) ethylene, (ii) at least one cycloolefin selected from cycloolefins represented by the following formula (I) or (II), and if necessary (iii) $\alpha$-olefin of 3-20 carbon atoms, said copolymerization is carried out in a liquid phase in the presence of a catalyst formed from:

(A) a soluble vanadium compound having a tertiary alkoxy group or $\beta$-diketone as a ligand, and (B) an organoaluminum compound represented by the formula $(i\text{-}Bu)_n AlCl_{3-n}$ wherein n is 1.0 to 2.5; and the obtained cycloolefin random copolymer comprises repeating units derived from (i) ethylene in an amount of 40 to 97% by mol, repeating units derived from (ii) at least one cycloolefin selected from cycloolefins represented by the following formula (I) or (II) in an amount of 3 to 60% by mol, and repeating units derived from (iii) $\alpha$-olefin of 3-20 carbon atoms in an amount of 0 to 20% by mol.

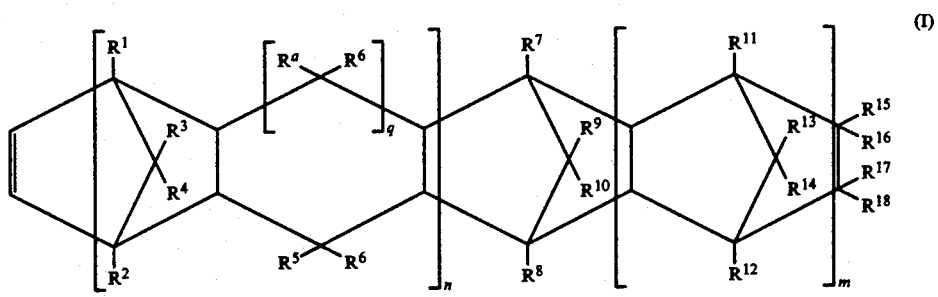

(I)

In the formula (I), n is 0 or 1; m is 0 or a positive integer; q is 0 or 1; $R^1$-$R^{18}$, $R^a$ and $R^b$ are each independently a hydrogen atom, a halogen atom or a hydrocarbon group; $R^{15}$-$R^{18}$ may be linked with one another to form a monocyclic or polycyclic group which may have a double bond; and $R^{15}$ and $R^{16}$, or $R^{17}$ and $R^{18}$ may together form an alkylidene group.

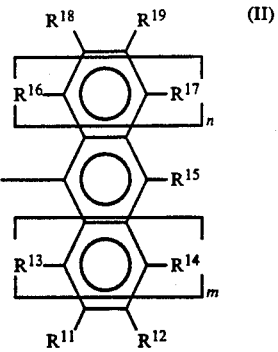

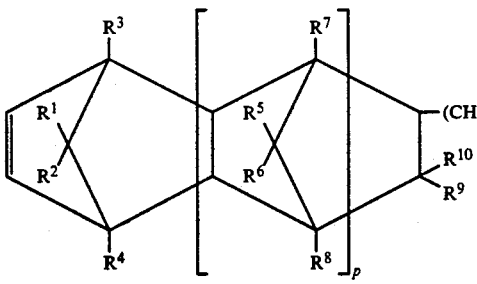

In the formula (II), each of p and q is independently 0 or an integer of 1 or more; each of m and n is independently 0, 1 or 2; $R^1$-$R^{19}$ are each independently a hydrogen atom, a halogen atom, an aliphatic hydrocarbon group, an alicyclic hydrocarbon group, an aromatic hydrocarbon group or an alkoxy group; a carbon atom to which $R^9$ and $R^{10}$ are linked may be bonded directly or by way of an alkylene group of 1-3 carbon atoms to a carbon atom to which $R^{13}$ is linked or a carbon atom to which $R^{11}$ is linked; and $R^{15}$ and $R^{12}$, or $R^{15}$ and $R^{19}$ may be linked together to form a monocyclic or polycyclic aromatic ring when each of n and m is 0.

The catalyst used in the invention which is formed from (A) a soluble vanadium compound having a tertiary alkoxy group or β-diketone as a ligand and (B) an organoaluminum compound represented by the formula (i-Bu)$_n$AlCl$_{3-n}$ (wherein n is 1.0 to 2.5) exhibits high catalyst activity in the copolymerization of ethylene and cycloolefin. In the copolymerization of ethylene and propylene, however, the catalyst exhibits catalyst activity of only about equal level to that of conventionally known catalysts such as a catalyst formed from VO(OEt)Cl$_2$ and AlEt$_{1.5}$Cl$_{1.5}$.

This means that the catalyst used in the invention shows high catalyst activity specifically to the copolymerization of ethylene and cycloolefin.

DETAILED DESCRIPTION OF THE INVENTION

The process for preparing a cycloolefin random copolymer according to the invention is described in detail hereinafter.

In the invention, a cycloolefin random copolymer is prepared by copolymerizing (i) ethylene and (ii) cycloolefin, and if necessary (iii) α-olefin. First, the cycloolefin (ii) is described below.

The cycloolefin (ii) used in the invention is represented by the following formula (I) or (II).

by using q is a 6-membered ring, and when q is 0, this ring is a 5-membered ring.

Further, in the above formula (I), $R^1$-$R^{18}$, $R^a$ and $R^b$ are each independently a hydrogen atom, a halogen atom or a hydrocarbon group. Examples of the halogen atom include fluorine atom, chlorine atom, bromine atom and iodine atom. Examples of the hydrocarbon group generally include alkyl group of 1-20 carbon atoms, halogenated alkyl group of 1-20 carbon atoms, cycloalkyl group of 3-15 carbon atoms and aromatic hydrocarbon group. Concrete examples of the alkyl group include methyl group, ethyl group, propyl group, isopropyl group, amyl group, hexyl group, octyl group, decyl group, dodecyl group and octadecyl group. Concrete examples of the halogenated alkyl group include groups obtained by substituting at least a part of hydrogen atoms in the above-mentioned alkyl groups with fluorine atom, chlorine atom, bromine atom or iodine atom. A concrete example of the cycloalkyl group is cyclohexyl group. Concrete examples of the aromatic hydrocarbon group include phenyl group and naphthyl group, and these groups may have lower alkyl group. Moreover, in the above formula (I), $R^{15}$ and $R^{16}$, $R^{17}$ and $R^{18}$, $R^{15}$ and $R^{17}$, $R^{16}$ and $R^{18}$, $R^{15}$ and $R^{18}$, or $R^{16}$ and $R^{17}$ may be linked together (or cooperate with each other) to form a monocyclic or polycyclic group, and thus formed monocyclic or polycyclic group may have double bond.

Examples of the monocyclic or polycyclic group are given below.

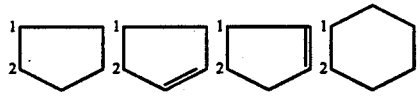

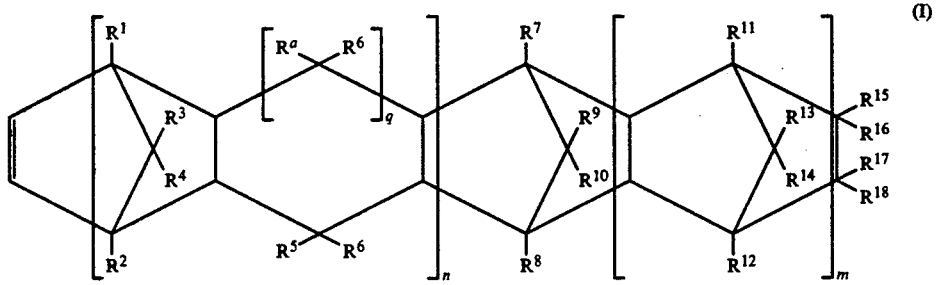

In the formula (I), n is 0 or 1, m is 0 or a positive integer, and q is 0 or 1. When q is 1, a ring represented -continued

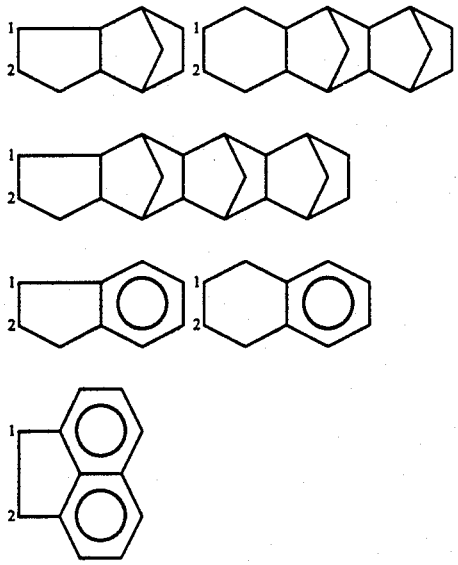

In the above-exemplified groups, carbon atoms attached with numerals 1 and 2 are those of alicyclic structure to which a group indicated by $R^{15}$–$R^{18}$ is linked.

In the above formula (I), $R^{15}$ and $R^{16}$, or $R^{17}$ and $R^{18}$ may together form an alkylidene group. This alkylidene group generally is alkylidene group of 2–20 carbon atoms, and examples of such alkylidene group include ethylidene group, propylidene group and isopropylidene group.

Furthermore, in the case of $n=m=0$, $R^{15}$ and $R^{12}$, or $R^{15}$ and $R^{19}$ may be linked together to form a monocyclic or polycyclic aromatic ring. Examples of the monocyclic or polycyclic aromatic ring include the following groups in which $R^{15}$ and $R^{12}$ together further form an aromatic ring in the case of $n=m=0$.

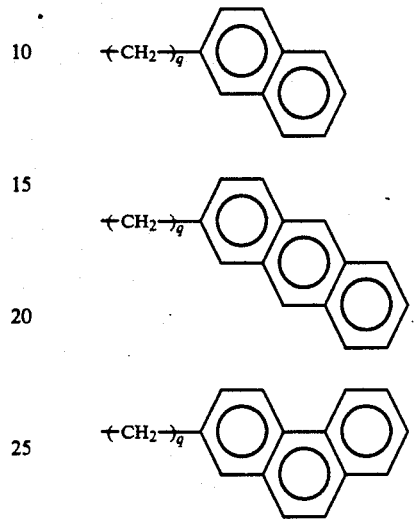

In the above formulas, q is the same as q in the formula (II).

In the formula (II), the halogen atom has the same meaning as that of the halogen atom in the formula (I). The aliphatic hydrocarbon group is alkyl group of 1–20 carbon atoms or halogenated alkyl group of 1–20 car-

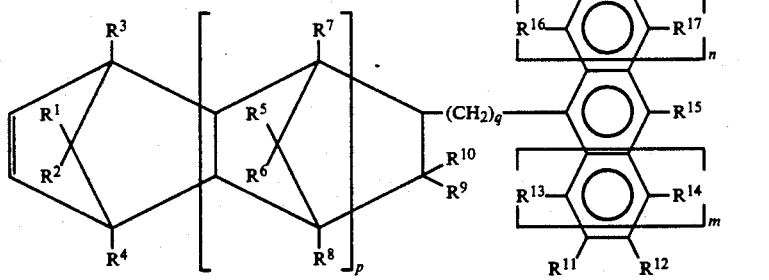

(II)

In the formula (II), each of p and q is independently 0 or an integer of 1 or more, and each of m and n is independently 0, 1 or 2.

Further, $R^1$–$R^{19}$ are each independently a hydrogen atom, a halogen atom, an aliphatic hydrocarbon group, an alicyclic hydrocarbon group, an aromatic hydrocarbon group or an alkoxy group. A carbon atom to which $R^9$ and $R^{10}$ are linked may be bonded directly or by way of an alkylene group of 1–3 carbon atoms to a carbon atom to which $R^{13}$ is linked or a carbon atom to which $R^{11}$ is linked. That is, when the above-mentioned two carbon atoms are bonded to each other by way of an alkylene group, a group indicated by $R^9$ and a group indicated by $R^{13}$, or a group indicated by $R^{10}$ and a group indicated by $R^{11}$ cooperate with each other to form any alkylene group among methylene group (—$CH_2$—), ethylene group (—$CH_2CH_2$—) and propylene group (—$CH_2CH_2CH_2$—).

bon atoms. Concrete examples of the alkyl group include methyl group, ethyl group, propyl group, isopropyl group, amyl group, hexyl group, octyl group, decyl group, dodecyl group and octadecyl group. Concrete examples of the halogenated alkyl group include groups obtained by substituting at least a part of hydrogen atoms in the above-mentioned alkyl groups with fluorine atom, chlorine atom, bromine atom or iodine atom. A concrete example of the alicyclic hydrocarbon group is cyclohexyl group. Concrete examples of the aromatic hydrocarbon group include phenyl group and naphthyl group, and these groups may have lower alkyl group.

Cycloolefins represented with Formulae (I) and (II) include, for example, bicyclo[2.2.1]hept-2-ene derivatives, tetracyclo[4.4.0.1$^{2,5}$.1$^{7,10}$]-3-dodecene derivatives, hexacyclo[6.6.1.1$^{3,6}$.1$^{10,13}$.0$^{2,7}$.0$^{9,14}$]-4-heptadecene derivatives, octacyclo[8.8.0.1$^{2,9}$.1$^{4,7}$.1$^{11,18}$.1$^{13,16}$.0$^{3,8}$.0$^{12,17}$]-5-dococene derivatives, pentacyclo[6.6.1.1$^{3,6}$.0$^{2,7}$.0$^{19,14}$]-4-hexadecene derivatives, heptacyclo-5-eicosene derivatives, heptacyclo-5-heneicosene derivatives, tricyclo[4.3.0.1$^{2,5}$]-3-decene derivatives, tricyclo[4.4.0.1$^{2,5}$]-3-undecene derivatives, pentacyclo[6.5.1.1$^{3,6}$.0$^{2,7}$.0$^{9,13}$]-4-pentadecene derivatives, pentacyclodecadiene derivatives, pentacyclo[7.4.0.1$^{2,5}$.1$^{9,12}$.0$^{8,13}$]-3-pentadecene derivatives, heptacyclo[8.7.0.1$^{3,6}$.1$^{10,17}$.1$^{12,15}$.0$^{2,7}$.0$^{11,16}$]-4-eicosene derivatives, noncyclo[10.9.1.1$^{4,7}$.1$^{13,20}$.1$^{15,18}$.0$^{3,8}$.0$^{2,10}$.0$^{12,21}$.0$^{14,19}$]-5-pentacocene derivatives, petnatacyclo[8.4.0.1$^{2,3}$.1$^{9,12}$.0$^{8,13}$]-3-hexadecene derivatives, heptacyclo[8.8.0.1$^{4,7}$.1$^{11,18}$.1$^{13,16}$.0$^{3,8}$.0$^{12,17}$]-5-heneicosene derivatives, nonacyclo[10.10.1.1$^{5,8}$.1$^{14,21}$.1$^{16,19}$.0$^{2,11}$.0$^{4,9}$.0$^{13,22}$.0$^{15,20}$]-6-hexacosene derivatives, bicyclo[2,2,1]hepto-2-ene derivatives, 1,4-methano-1,4,4a,9a-tetrahydrofluorene derivatives, 1,4-methano-1,4,4a,5,10,10a-hexahydroanthracene derivatives, cyclopentadiene-acenaphthylene adducts and the like.

Examples of the cycloolefins represented in Formulae [I] and [II] are as follows:

The bicyclo[2.2.1]hept-2-ene derivatives such as

 Bicyclo[2.2.1]hept-2-ene

 —CH$_3$   6-Methylbicyclo[2.2.1]hept-2-ene

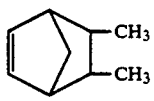 —CH$_3$ / —CH$_3$   5,6-Dimethylbicyclo[2.2.1]-hept-2-ene

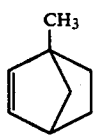 CH$_3$   1-Methylbicyclo[2.2.1]hept-2-ene

 —C$_2$H$_5$   6-Ethylbicyclo[2.2.1]hept-2-ene

 —nC$_4$H$_9$   6-n-Butylbicyclo[2.2.1]hept-2-ene

 —iC$_4$H$_9$   6-Isobutylbicyclo[2.2.1]hept-2-ene

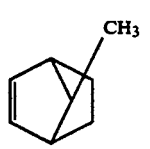 CH$_3$   7-Methylbicyclo[2.2.1]hept-2-ene;

the tetracyclo[4.4.01.$^{2,5}$.1$^{7,10}$]-3-dodecene derivatives such as

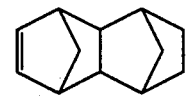 Tetracyclo[4.4.0.1$^{2,5}$.1$^{7,10}$]-3-dodecene

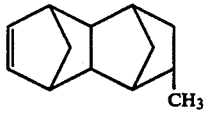 CH$_3$   8-Methyltetracyclo[4.4.0.1$^{2,5}$.1$^{7,10}$]-3-dodecene

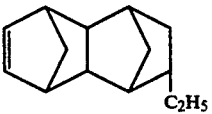 C$_2$H$_5$   8-Ethyltetracyclo[4.4.0.1$^{2,5}$.1$^{7,10}$]-3-dodecene

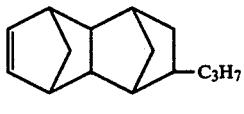 C$_3$H$_7$   8-Propyltetracyclo[4.4.0.1$^{2,5}$.1$^{7,10}$]-3-dodecene

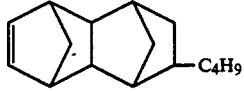 C$_4$H$_9$   8-Butyltetracyclo[4.4.0.1$^{2,5}$.1$^{7,10}$]-3-dodecene

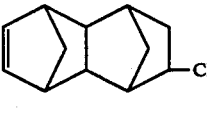 CH$_3$ / CH$_2$CH / CH$_3$   8-Isobutyltetracyclo-[4.4.0.1$^{2,5}$.1$^{7,10}$]-3-dodecene

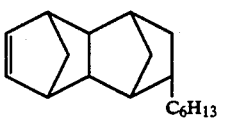 C$_6$H$_{13}$   8-Hexyltetracyclo[4.4.0.1$^{2,5}$.1$^{7,10}$]-3-dodecene

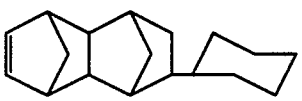 8-Cyclohexyltetracyclo-[4.4.0.1$^{2,5}$.1$^{7,10}$]-3-dodecene

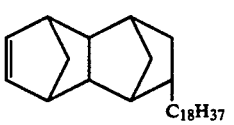 C$_{18}$H$_{37}$   8-Stearyltetracyclo-[4.4.0.1$^{2,5}$.1$^{7,10}$]-3-dodecene

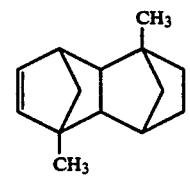 CH$_3$ / CH$_3$   5,10-Dimethyltetracyclo-[4.4.0.1$^{2,5}$.1$^{7,10}$]-3-dodecene

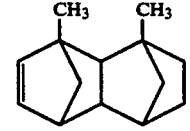 CH$_3$ CH$_3$   2,10-Dimethyltetracyclo-[4.4.0.1$^{2,5}$.1$^{7,10}$]-3-dodecene

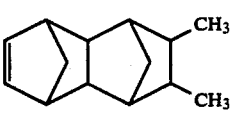 CH$_3$ / CH$_3$   8,9-Dimethyltetracyclo-[4.4.0.1$^{2,5}$.1$^{7,10}$]-3-dodecene -continued

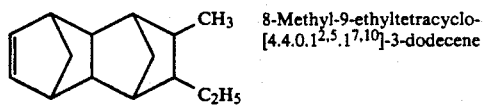
8-Methyl-9-ethyltetracyclo-[4.4.0.1$^{2,5}$.1$^{7,10}$]-3-dodecene

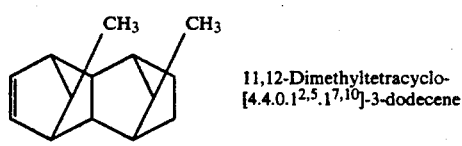
11,12-Dimethyltetracyclo-[4.4.0.1$^{2,5}$.1$^{7,10}$]-3-dodecene

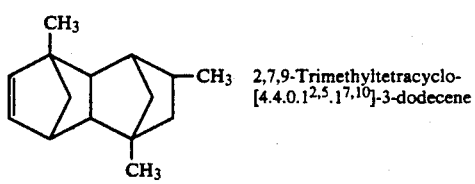
2,7,9-Trimethyltetracyclo-[4.4.0.1$^{2,5}$.1$^{7,10}$]-3-dodecene

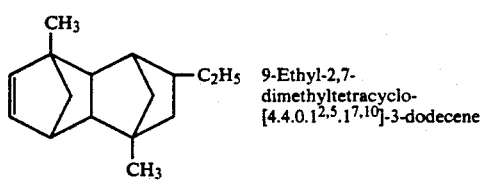
9-Ethyl-2,7-dimethyltetracyclo-[4.4.0.1$^{2,5}$.1$^{7,10}$]-3-dodecene

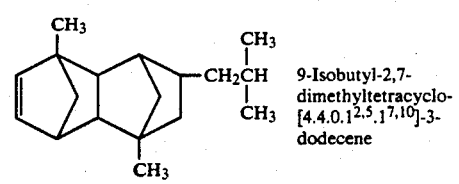
9-Isobutyl-2,7-dimethyltetracyclo-[4.4.0.1$^{2,5}$.1$^{7,10}$]-3-dodecene

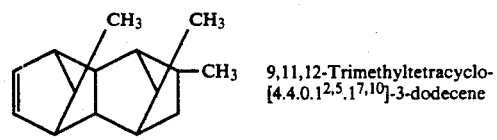
9,11,12-Trimethyltetracyclo-[4.4.0.1$^{2,5}$.1$^{7,10}$]-3-dodecene

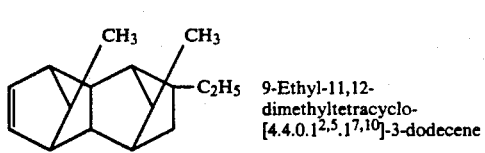
9-Ethyl-11,12-dimethyltetracyclo-[4.4.0.1$^{2,5}$.1$^{7,10}$]-3-dodecene

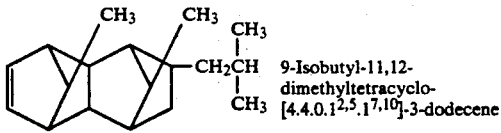
9-Isobutyl-11,12-dimethyltetracyclo-[4.4.0.1$^{2,5}$.1$^{7,10}$]-3-dodecene

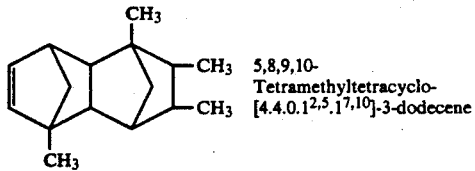
5,8,9,10-Tetramethyltetracyclo-[4.4.0.1$^{2,5}$.1$^{7,10}$]-3-dodecene

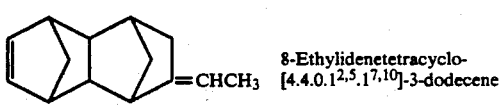
8-Ethylidenetetracyclo-[4.4.0.1$^{2,5}$.1$^{7,10}$]-3-dodecene

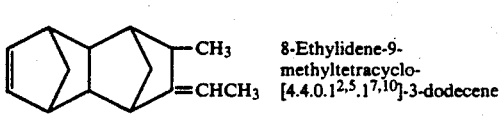
8-Ethylidene-9-methyltetracyclo-[4.4.0.1$^{2,5}$.1$^{7,10}$]-3-dodecene

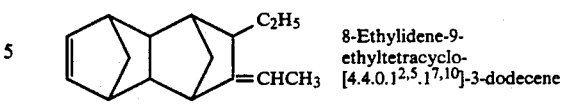
8-Ethylidene-9-ethyltetracyclo-[4.4.0.1$^{2,5}$.1$^{7,10}$]-3-dodecene

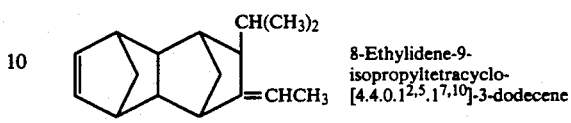
8-Ethylidene-9-isopropyltetracyclo-[4.4.0.1$^{2,5}$.1$^{7,10}$]-3-dodecene

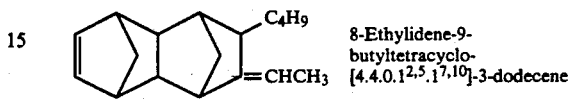
8-Ethylidene-9-butyltetracyclo-[4.4.0.1$^{2,5}$.1$^{7,10}$]-3-dodecene

8-n-Propylidenetetracyclo-[4.4.0.1$^{2,5}$.1$^{7,10}$]-3-dodecene

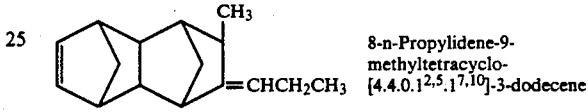
8-n-Propylidene-9-methyltetracyclo-[4.4.0.1$^{2,5}$.1$^{7,10}$]-3-dodecene

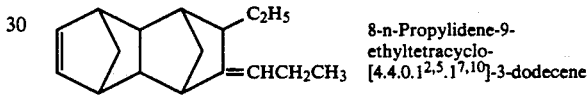
8-n-Propylidene-9-ethyltetracyclo-[4.4.0.1$^{2,5}$.1$^{7,10}$]-3-dodecene

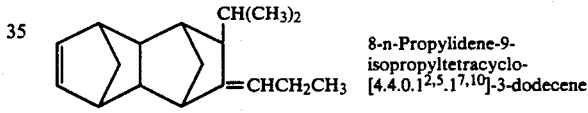
8-n-Propylidene-9-isopropyltetracyclo-[4.4.0.1$^{2,5}$.1$^{7,10}$]-3-dodecene

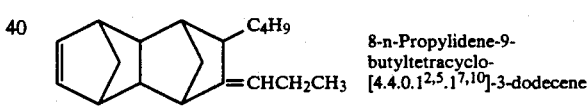
8-n-Propylidene-9-butyltetracyclo-[4.4.0.1$^{2,5}$.1$^{7,10}$]-3-dodecene

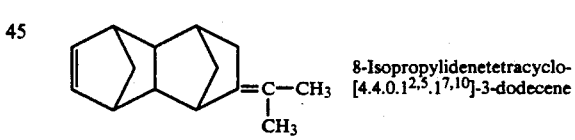
8-Isopropylidenetetracyclo-[4.4.0.1$^{2,5}$.1$^{7,10}$]-3-dodecene

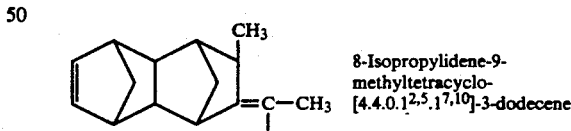
8-Isopropylidene-9-methyltetracyclo-[4.4.0.1$^{2,5}$.1$^{7,10}$]-3-dodecene

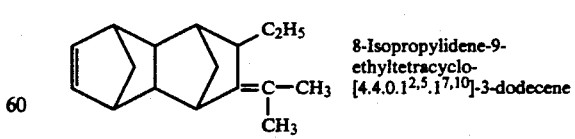
8-Isopropylidene-9-ethyltetracyclo-[4.4.0.1$^{2,5}$.1$^{7,10}$]-3-dodecene

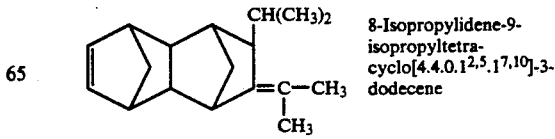
8-Isopropylidene-9-isopropyltetracyclo[4.4.0.1$^{2,5}$.1$^{7,10}$]-3-dodecene -continued

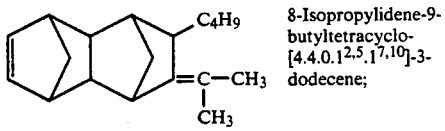 8-Isopropylidene-9-butyltetracyclo-[4.4.0.1$^{2,5}$.1$^{7,10}$]-3-dodecene;

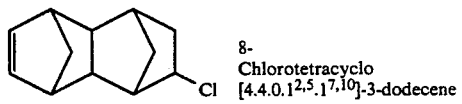 8-Chlorotetracyclo[4.4.0.1$^{2,5}$.1$^{7,10}$]-3-dodecene

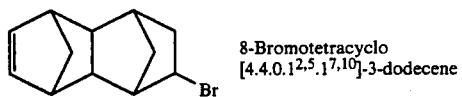 8-Bromotetracyclo[4.4.0.1$^{2,5}$.1$^{7,10}$]-3-dodecene

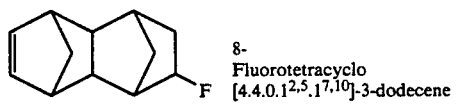 8-Fluorotetracyclo[4.4.0.1$^{2,5}$.1$^{7,10}$]-3-dodecene

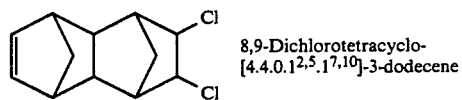 8,9-Dichlorotetracyclo-[4.4.0.1$^{2,5}$.1$^{7,10}$]-3-dodecene the hexacyclo[6.6.1.1$^{3,6}$.1$^{10,13}$.0$^{2,7}$.0$^{9,14}$]-4-heptadecene derivatives such as

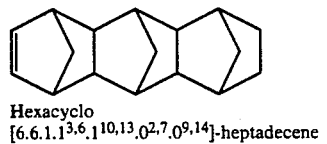

Hexacyclo[6.6.1.1$^{3,6}$.1$^{10,13}$.0$^{2,7}$.0$^{9,14}$]-heptadecene

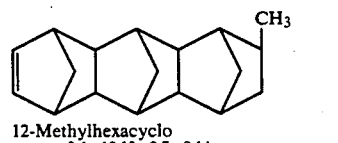

12-Methylhexacyclo[6.6.1.1$^{3,6}$.1$^{10,13}$.0$^{2,7}$.0$^{9,14}$]-4-heptadecene

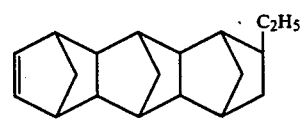

12-Ethylhexacyclo[6.6.1.1$^{3,6}$.1$^{10,13}$.0$^{2,7}$.0$^{9,14}$]-4-heptadecene

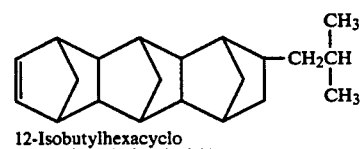

12-Isobutylhexacyclo[6.6.1.1$^{3,6}$.1$^{10,13}$.0$^{2,7}$.0$^{9,14}$]-4-heptadecene

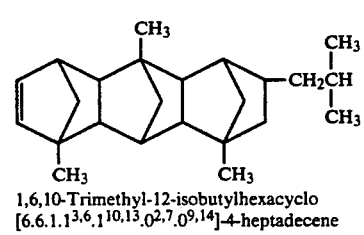

1,6,10-Trimethyl-12-isobutylhexacyclo[6.6.1.1$^{3,6}$.1$^{10,13}$.0$^{2,7}$.0$^{9,14}$]-4-heptadecene the octacyclo[8.8.0.1$^{2,9}$.1$^{4,7}$.1$^{11,18}$.1$^{13,16}$.0$^{3,8}$.0$^{12,17}$]-5-docosene derivatives such as

Octacyclo[8.8.0.1$^{2,9}$.1$^{4,7}$.1$^{11,18}$.1$^{13,16}$.0$^{3,8}$.0$^{12,17}$]-5-docosene

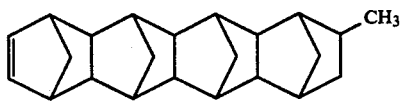

15-Methyloctacyclo[8.8.0.1$^{2,9}$.1$^{4,7}$.1$^{11,18}$.1$^{13,16}$.0$^{3,8}$.0$^{12,17}$]-5-docosene

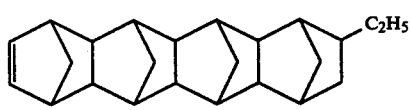

15-Ethyloctacyclo[8.8.0.1$^{2,9}$.1$^{4,7}$.1$^{11,18}$.1$^{13,16}$.0$^{3,8}$.0$^{12,17}$]-5-docosene;

the pentacyclo[6,6,1,1$^{3.6}$,0$^{2.7}$,0$^{9.14}$]-4-hexadecene derivatives such as

Pentacyclo[6,6,1,1$^{3.6}$,0$^{2.7}$,0$^{9.14}$]-4-hexadecene

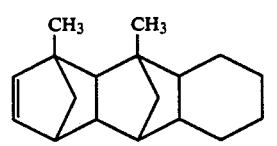

1,3-Dimethylpentacyclo-[6,6,1,1$^{3.6}$,0$^{2.7}$,0$^{9.14}$]-4-hexadecene

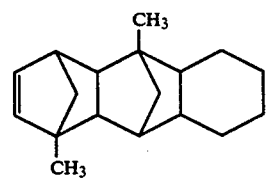

1,6-Dimethylpentacyclo-[6,6,1,1$^{3.6}$,0$^{2.7}$,0$^{9.14}$]-4-hexadecene

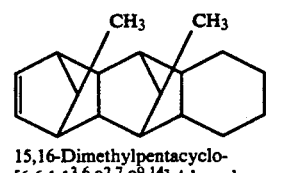

15,16-Dimethylpentacyclo-[6,6,1,1$^{3.6}$,0$^{2.7}$,0$^{9.14}$]-4-hexadecene;

the heptacyclo-5-eicosene derivatives or heptacyclo-5-heneicosene derivatives such as

Heptacyclo[8.7.0.1$^{2,9}$.1$^{4,7}$.1$^{11,17}$.0$^{3,8}$.0$^{12,16}$]-5-eicosene

Heptacyclo[8.8.0.1$^{2,9}$.1$^{4,7}$.1$^{11,18}$.0$^{3,8}$.0$^{12,17}$]-5-heneicosene the tricyclo[4,3,0.1$^{2.5}$]-3-decene derivatives such as

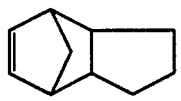

Tricyclo[4.3.0.1$^{2,5}$]-3-decene

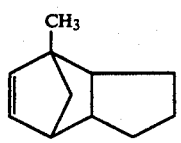

2-Methyltricyclo[4.3.0.1$^{2,5}$]-3-decene

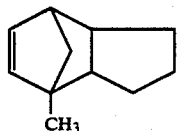

5-Methyltricyclo[4.3.0.1$^{2,5}$]-3-decene;

the tricyclo[4.4.0.1$^{2,5}$]-3-undecene derivatives such as

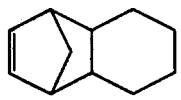

Tricyclo[4.4.0.1$^{2,5}$]-3-undecene

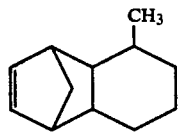

10-Methyltricyclo[4.4.0.1$^{2,5}$]-3-undecene;

the pentcyclo[6.5.1.1$^{3,6}$.0$^{2,7}$.0$^{9,13}$]-4-pentadecene derivatives such as

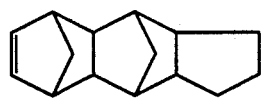

Pentacyclo[6.5.1.1$^{3,6}$.0$^{2,7}$.0$^{9,13}$]-4-pentadecene

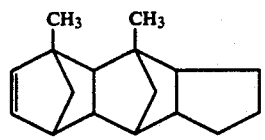

1,3-Dimethylpentacyclo[6.5.1.1$^{3,6}$.0$^{2,7}$.0$^{9,13}$]-4-pentadecene

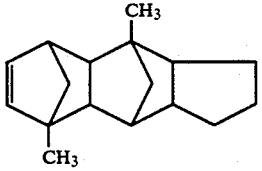

1,6-Dimethylpentacyclo[6.5.1.1$^{3,6}$.0$^{2,7}$.0$^{9,13}$]-4-pentadecene

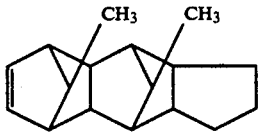

14,15-Dimethylpentacyclo[6.5.1.1$^{3,6}$.0$^{2,7}$.0$^{9,13}$]-4-pentadecene;

the diene compounds such as

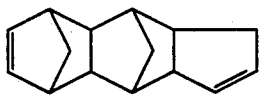

Pentacyclo[6.5.1.1$^{3,6}$.0$^{2,7}$.0$^{9,13}$]-4,10-pentadecadiene;

the pentacyclo[7.4.0.1$^{2,5}$.1$^{9,12}$.0$^{8,13}$]-3-pentadecene derivatives such as

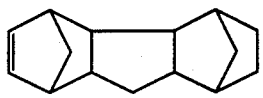

Pentacyclo[7.4.0.1$^{2,5}$.1$^{9,12}$.0$^{8,13}$]-3-pentadecene

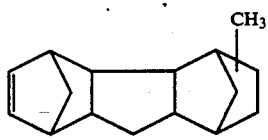

Methyl-substituted pentacyclo[7.4.0.1$^{2,5}$.1$^{9,12}$.0$^{8,13}$]-3-pentadecene;

the heptacyclo[8.7.0.1$^{3,6}$.1$^{10,17}$.1$^{12,15}$.0$^{2,7}$.0$^{11,16}$]-4-eicosene derivatives such as

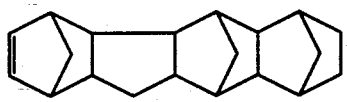

Heptacyclo[8.7.0.1$^{3,6}$.1$^{10,17}$.1$^{12,15}$.0$^{2,7}$.0$^{11,16}$]-4-eicosene

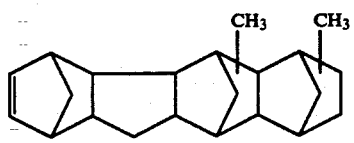

Dimethyl-substituted heptacyclo[7.8.0.1$^{3,6}$.1$^{10,17}$.1$^{12,15}$.0$^{2,7}$.0$^{11,16}$]-4-eicosene;

the nonacyclo[10.9.1.1$^{4,7}$.1$^{13,20}$.1$^{15,18}$.0$^{3,8}$.0$^{2,10}$.0$^{12,21}$.0$^{14,19}$]-5-pentacosene derivatives such as

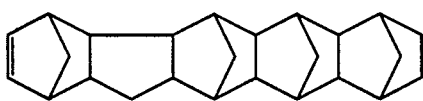

Nonacyclo [10.9.1.1$^{4,7}$.1$^{13,20}$.1$^{15,18}$.0$^{3,8}$.0$^{2,10}$.0$^{12,21}$.0$^{14,19}$]-5-pentacosene

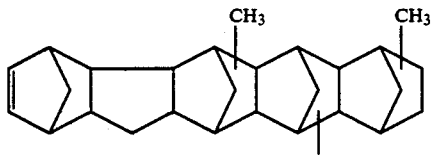

Trimethyl-substituted-nonacyclo-[10.9.1.1$^{4,7}$.1$^{13,20}$.1$^{15,18}$.0$^{3,8}$.0$^{2,10}$.0$^{12,21}$.0$^{14,19}$]-5-pentacosene The Pentacyclo[8.4.0.1$^{2,5}$.1$^{9,12}$.0$^{8,13}$]-3-hexadecene derivatives such as

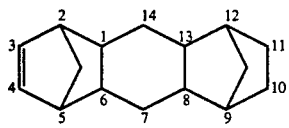

Pentacyclo [8.4.0.1$^{2,5}$.1$^{9,12}$.0$^{8,13}$]-3-hexadecene

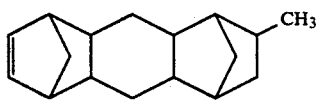

11-Methylpentacyclo [8.4.0.1$^{2,5}$.1$^{9,12}$.0$^{8,13}$]-3-hexadecene

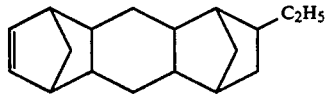

11-Ethylpentacyclo [8.4.0.1$^{2,5}$.1$^{9,12}$.0$^{8,13}$]-3-hexadecene

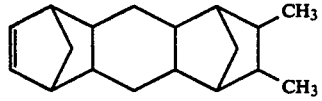

10, 11-Dimethylpentacyclo [8.4.0.1$^{2,5}$.1$^{9,12}$.0$^{8,13}$]-3-hexadecene

The heptacyclo [8.8.0.1$^{4,7}$.1$^{11,18}$.1$^{13,16}$.0$^{3,8}$.0$^{12,17}$]-5-heneicosene derivatives such as

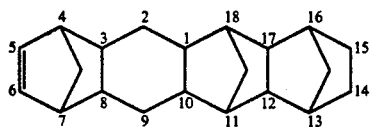

Heptacyclo [8.8.0.1$^{4,7}$.1$^{11,18}$.1$^{13,16}$.0$^{3,8}$.0$^{12,17}$]-5-heneicosene

15-Methylheptacyclo [8.8.0.1$^{4,7}$.1$^{11,18}$.1$^{13,16}$.0$^{3,8}$.0$^{12,17}$]-5-heneicosene

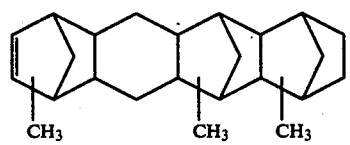

Trimethyl-substituted-heptacyclo [8.8.0.1$^{4,7}$.1$^{11,18}$.1$^{13,16}$.0$^{3,8}$.0$^{12,17}$]-5-heneicosene The nonacyclo [10.10.1.1$^{5,8}$.1$^{14,21}$.1$^{16,19}$.0$^{2,11}$.0$^{4,9}$.0$^{13,22}$.0$^{15,20}$]-6-hexacosene derivatives such as

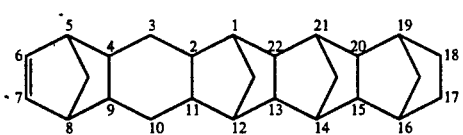

Nonacyclo [10.10.1.1$^{5,8}$.1$^{14,21}$.1$^{16,19}$.0$^{2,11}$.0$^{4,9}$.0$^{13,22}$.0$^{15,20}$]-6-hexacosene and furthermore,

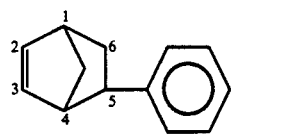

5-Phenyl-bicyclo[2.2.1] hept-2-ene

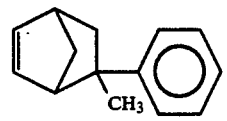

5-Methyl-5-phenyl-bicyclo[2.2.1]-hept-2-ene

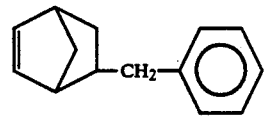

5-Benzyl-bicyclo[2.2.1]hept-2-ene

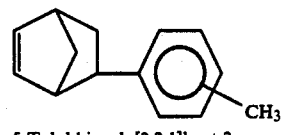

5-Tolyl-bicyclo[2.2.1]hept-2-ene

-continued

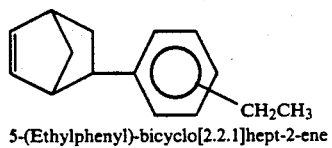
5-(Ethylphenyl)-bicyclo[2.2.1]hept-2-ene

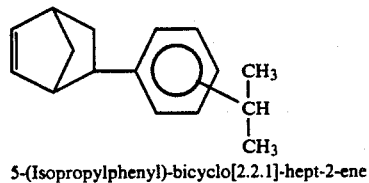
5-(Isopropylphenyl)-bicyclo[2.2.1]-hept-2-ene

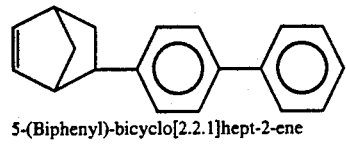
5-(Biphenyl)-bicyclo[2.2.1]hept-2-ene

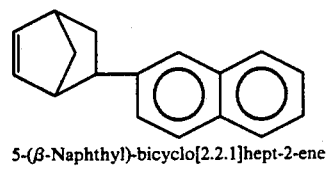
5-(β-Naphthyl)-bicyclo[2.2.1]hept-2-ene

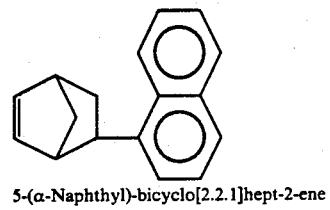
5-(α-Naphthyl)-bicyclo[2.2.1]hept-2-ene

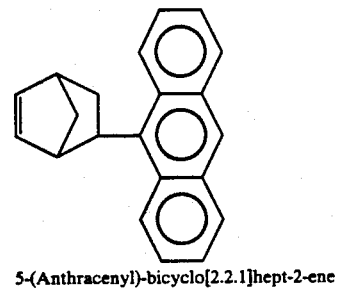
5-(Anthracenyl)-bicyclo[2.2.1]hept-2-ene

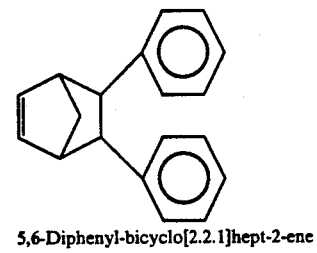
5,6-Diphenyl-bicyclo[2.2.1]hept-2-ene

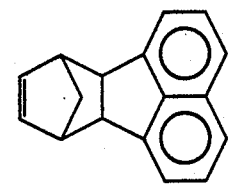

-continued
Cyclopentadiene-acenaphthylene adducts

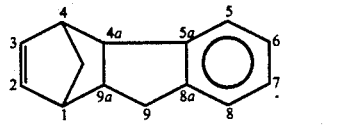
1,4-Methano-1,4,4a,9a-tetrahydro-fluorene

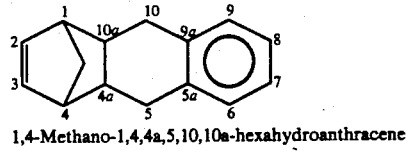
1,4-Methano-1,4,4a,5,10,10a-hexahydroanthracene

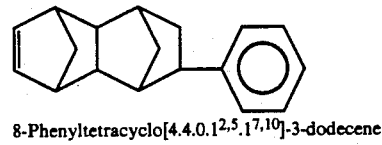
8-Phenyltetracyclo[4.4.0.1$^{2,5}$.1$^{7,10}$]-3-dodecene

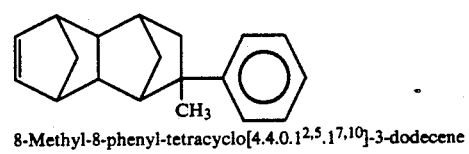
8-Methyl-8-phenyl-tetracyclo[4.4.0.1$^{2,5}$.1$^{7,10}$]-3-dodecene

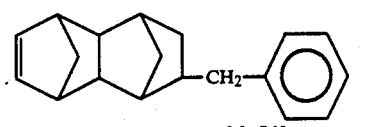
8-Benzyl-tetracyclo[4.4.0.1$^{2,5}$.1$^{7,10}$]-3-dodecene

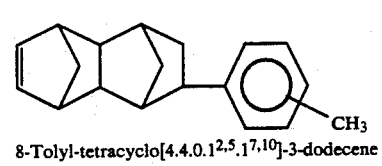
8-Tolyl-tetracyclo[4.4.0.1$^{2,5}$.1$^{7,10}$]-3-dodecene

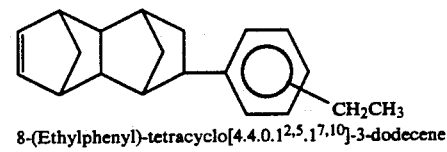
8-(Ethylphenyl)-tetracyclo[4.4.0.1$^{2,5}$.1$^{7,10}$]-3-dodecene

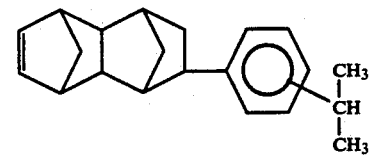
8-(Isopropylphenyl)tetracyclo[4.4.0.1$^{2,5}$.1$^{7,10}$]-3-dodecene

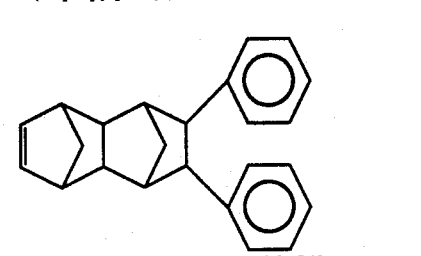
8,9-Diphenyl-tetracyclo[4.4.0.1$^{2,5}$.1$^{7,10}$]-3-dodecene

-continued

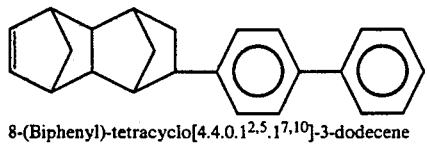

8-(Biphenyl)-tetracyclo[4.4.0.1$^{2,5}$.1$^{7,10}$]-3-dodecene

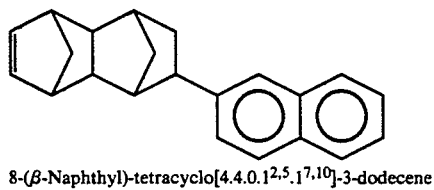

8-($\beta$-Naphthyl)-tetracyclo[4.4.0.1$^{2,5}$.1$^{7,10}$]-3-dodecene

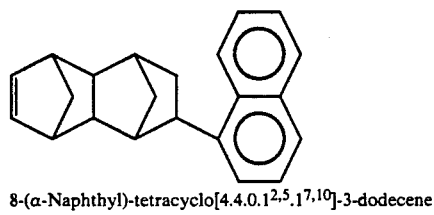

8-($\alpha$-Naphthyl)-tetracyclo[4.4.0.1$^{2,5}$.1$^{7,10}$]-3-dodecene

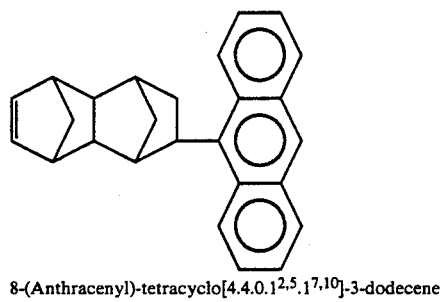

8-(Anthracenyl)-tetracyclo[4.4.0.1$^{2,5}$.1$^{7,10}$]-3-dodecene

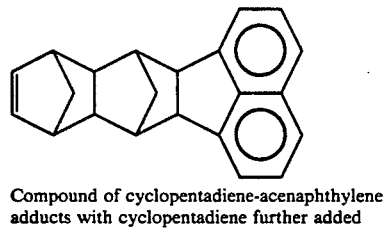

Compound of cyclopentadiene-acenaphthylene adducts with cyclopentadiene further added

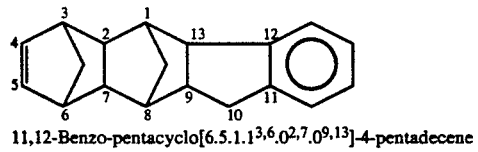

11,12-Benzo-pentacyclo[6.5.1.1$^{3,6}$.0$^{2,7}$.0$^{9,13}$]-4-pentadecene

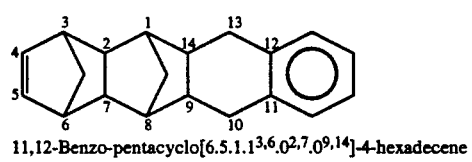

11,12-Benzo-pentacyclo[6.5.1.1$^{3,6}$.0$^{2,7}$.0$^{9,14}$]-4-hexadecene

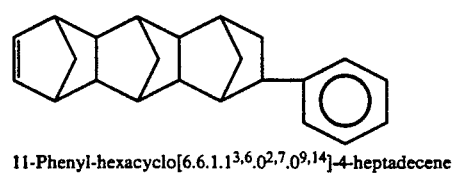

11-Phenyl-hexacyclo[6.6.1.1$^{3,6}$.0$^{2,7}$.0$^{9,14}$]-4-heptadecene

-continued

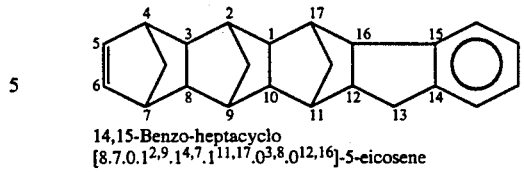

14,15-Benzo-heptacyclo [8.7.0.1$^{2,9}$.1$^{4,7}$.1$^{11,17}$.0$^{3,8}$.0$^{12,16}$]-5-eicosene The cycloolefins (ii) represented by the above formula (I) or ((I) can be prepared by Diels-Alder reaction of cyclopentadiene with the corresponding olefins.

These cyloolefins (ii) may be used singly or in combination of two or more kinds.

In the present invention, there can be further used (iii) $\alpha$-olefin of 3-20 carbon atoms if necessary. Concrete examples of such $\alpha$-olefins include propylene, 1-butene, 1-pentene, 1-hexene, 3-methyl-1-butene, 3-methyl-1-pentene, 3-ethyl-1-pentene, 4-methyl-1-pentene, 4-methyl-1-hexene, 4,4-dimethyl-1-hexene, 4,4-dimethyl-1-pentene, 4-ethyl-1-hexene, 3-ethyl-1-hexene, 1-octene, 1-decene, 1-dodecene, 1-tetradecene, 1-hexadecene, 1-octadecene and 1-eicosene. These $\alpha$-olefins may be used singly or in combination of two or more kinds.

Furthermore, other polymerizable monomers which can be copolymerized may be also used if desired, with the proviso that they do not mar the object of the present invention. The polymerizable monomers which can be further used include cycloolefins other than the above-described cycloolefins (ii) represented by the formula (I) or (II).

Concrete examples of such cycloolefins include cyclobutene, cyclopentene, cyclohexene, 3,4-dimethylcyclopentene, 3-methylcyclohexene, 2-(2-methylbutyl)-1-cyclohexene and 3a,5,6,7a-tetrahydro-4,7-methano-1H-indene. Also employable are olefins such as styrene and $\alpha$-methylstyrene.

In the invention, ethylene (i), the above-mentioned cycloolefin (ii) and if necessary the $\alpha$-olefin (iii) are copolymerized in a liquid phase in the presence of a catalyst. As the liquid phase, the cycloolefin (ii) and the $\alpha$-olefin (iii) may be per se used, or hydrocarbon solvents mentioned below may be used.

Examples of the hydrocarbon solvents employable as the liquid phase include aliphatic hydrocarbons such as pentane, hexane, heptane, octane, decane, dodecane and kerosine; halogen derivatives of those aliphatic hydrocarbons; alicyclic hydrocarbons such as cyclohexane, methylcyclopentane and methylcyclohexane; halogen derivatives of those alicyclic hydrocarbons; aromatic hydrocarbons such as benzene, toluene and xylene; and halogen derivatives of those aromatic hydrocarbons such as chlorobenzene. These solvents may be used in the form of a mixture of two or more kinds.

In the invention, the copolymerization is preferably carried out in the presence of the above-mentioned hydrocarbon solvents, and among them, the copolymerization is particularly preferably carried out in the presence of a mixture solvent such as cyclohexane/hexane, cyclohexane/heptane, cyclohexane/pentane, toluene/hexane, toluene/heptane or toluene/pentane.

The cycloolefin random copolymer prepared by the invention comprises repeating units derived from (i) ethylene and repeating units derived from (ii) cycloolefin. The repeating units derived from ethylene are contained in the cycloolefin random copolymer usually in an amount of 40 to 97% by mol, preferably 50 to 95% by mol, more preferably 55 to 90% by mol, and the repeating units derived from cycloolefin are contained therein usually in an amount of 3 to 60% by mol, preferably 5 to 50% by mol, more preferably 10 to 45% by mol. In the cycloolefin random copolymer, there may be further contained, if necessary, repeating units derived from (iii) α-olefin in an amount of not more than 20% by mol, preferably not more than 10% by mol, more preferably not more than 5% by mol. Furthermore, as described before, repeating units derived from other polymerizable monomers than the above-mentioned monomers may be contained in the copolymer in such an amount that the object of the invention is not marred.

An intrinsic viscosity [η] of the cycloolefin random copolymer prepared by the invention as measured in Decalin (decahydronaphtlene) at 135° C. is preferably in the range of 0.01 to 10 dl/g, more preferably 0.05 to 5.0 dl/g.

In the preparation of a cycloolefin random copolymer by copolymerizing the ethylene (i), the cycloolefin (ii) and if necessary the α-olefin (iii) in accordance with the invention, the ethylene (i), the cycloolefin (ii) and the α-olefin which is optionally used depending on necessity are fed to the polymerization system in such amounts that the resulting copolymer has the above-defined composition.

Next, the catalyst employable in the present invention is described in detail.

The catalyst employable in the invention is formed from (A) a soluble vanadium compound and (B) an organoaluminum compound. The term "soluble" used herein means to be capable of being dissolved in the liquid media present in the polymerization system.

The soluble vanadium compound (A) used in the invention has a tertiary alkoxy group or β-diketone as a ligand in its molecule. Concretely, the compound having the tertiary alkoxy group as a ligand is represented by the following formula (A-1), and the compound having the β-diketone as a ligand is represented by the following formula (A-2).

$$VO(OCRI^1{}_3)_aX_b \text{ or } V(OCR^2{}_3)_cX_d \quad (A-1)$$

In the formula (A-1), each of R$^1$ and R$^2$ is a straight-chain or branched alkyl group of 1–5 carbon atoms, X is a chlorine atom or a bromine atom, and a, b, c and d are numbers satisfying the conditions of 0.5≦a≦3, 0≦b≦2.5, 2≦a+b≦3, 0.5≦c≦4, 0≦d≦3.5, and 3≦c+d≦4.

$$VO(D^1)_eY_f \text{ or } V(D^2)_gY_h \quad (A-2)$$

In the formula (A-2), each of D$^1$ and D$^2$ is an acetylacetonate (abbreviated to "acac" hereinafter) group represented by the following formula or a 2-methyl-1,3-butanedionate (abbreviated to "mmh" hereinafter) group represented by the following formula, and Y is an alkyl group, an alkoxy group or halogen. Further, e, f, g and h are numbers satisfying the conditions of 1≦e≦2, 0 ≦f≦1, 2≦e+f≦3, 1≦g≦3, 0≦h≦3, and 3≦g+h≦4.

acac:

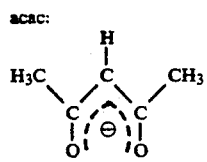

mmh:

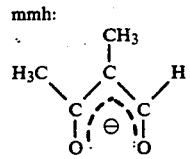

Concrete examples of the soluble vanadium compound having a tertiary alkoxy group as a ligand, which is represented by the above formula (A-1), are given below.

VO(tert-butyloxy)Cl$_2$
VO(tert-butyloxy)$_2$Cl
VO(tert-butyloxy)$_3$
VO(2,3-dimethyl-2-butyloxy)Cl$_2$
VO(2,3-dimethyl-2-butyloxy)$_2$Cl
VO(2,3-dimethyl-2-butyloxy)$_3$
VO(2-methyl-2-pentyloxy)Cl$_2$
VO(2-methyl-2-pentyloxy)$_2$Cl
VO(2-methyl-2-pentyloxy)$_3$
VO(3-methyl-3-pentyloxy)Cl$_2$
VO(3-methyl-3-pentyloxy)$_2$Cl
VO(3-methyl-3-pentyloxy)$_3$
VO(2,3-dimethyl-3-pentyloxy)Cl$_2$
VO(2,3-dimethyl-3-pentyloxy)$_2$Cl
VO(2,3-dimethyl-3-pentyloxy)$_3$
VO(3-ethyl-3-pentyloxy)Cl$_2$
VO(3-ethyl-3-pentyloxy)$_2$Cl
VO(3-ethyl-3-pentyloxy)$_3$
VO(2-methyl-2-hexyloxy)Cl$_2$
VO(2-methyl-2-hexyloxy)$_2$Cl
VO(2-methyl-2-hexyloxy)$_3$
V(tert-butyloxy)Cl$_3$
V(tert-butyloxy)$_2$Cl$_2$
V(tert-butyloxy)$_3$Cl
V(2,3-dimethyl-2-butyloxy)Cl$_3$
V(2,3-dimethyl-2-butyloxy)$_2$Cl$_2$
V(2,3-dimethyl-2-butyloxy)$_3$Cl
V(tert-butyloxy)Cl$_2$
V(tert-butyloxy)$_2$Cl
V(tert-butyloxy)$_3$ Concrete examples of the soluble vanadium compound having α-diketone as a ligand, which is represented by the above formula (A-2), are given below.

VO(acac)$_2$
VO(mmh)$_2$
VO(acac)X$_2$
VO(acac)X$_1$
VO(mmh)X$_2$
VO(mmh)X$_1$
V(acac)$_3$
V(mmh)$_3$
V(acac)$_2$X$_2$
V(acac)$_2$X
V(mmh)$_2$X$_2$
V(mmh)$_2$X In the above-exemplified compounds, X is Cl, F, Br, I an alkyl group, a primary alkoxy group or a secondary alkoxy group. Of these, Cl is preferred.

Those compounds may be used singly or in combination of two or more kinds.

Among the above compounds, preferred are VO-(OR$_3$)Cl$_2$, VO(acac)$_2$, VO(mmh)$_2$, v(acac)$_3$ and V(mmh)$_3$.

The soluble vanadium compound (A) can be used in the form of an electron donor addition product thereof obtained by bringing such electron donors as mentioned below into contact with the above-mentioned soluble vanadium compounds.

Such electron donors include, for example, hydrogen containing electron donors, such as alcohols, phenols, ketones, aldehydes, carboxylic acids, organic acid halides, esters of organic or inorganic acids, ethers, diethers, acid amides, acid anhydrides, alkoxysilanes and the like, and nitrogen containing electron donors, such as ammonias, amines, nitriles, pyridines, isocyanates and the like; more concretly, alcohols having from 1 to 18 carbon atoms, such as methanol, ethanol, propanol, butanol, pentanol, hexanol, 2-ethylhexanol, octanol, dodecanol, octadecyl alcohol, oleyl alcohol, bnenzyl alcohol, phenylethyl alcohol, cumyl alcohol, isopropyl alcohol, isopropylbenzyl alcohol and the like, halogen containing alcohols having from 1 to 18 carbon atoms, such as trichloromethanol, trichloroethanol, trichlorohexanol and the like, phenols which have from 6 to 20 carbon atoms and may have a lower alkyl group, such as phenol, cresol, xylenol, ethylphenol, propylphenol, nonyl phenol, cumyl phenol, naphthol and the like, ketones having from 3 to 15 carbon atoms, such as acetone, methylethyl ketone, methylisobutyl ketone, acetophenone, benzophenone, benzoquinone and the like, aldehydes having from 2 to 15 carbon atoms, such as acetaldehyde, propionaldehyde, octylaldehyde, benzaldehyde, tolualdehyde, naphthaldehyde and the like, organic acid esters having from 2 to 18 carbon atoms, such as methyl formate, methyl acetate, ethyl acetate, vinyl acetate, propyl acetate, octyl acetate, cyclohexyl acetate, ethyl propionate, methyl butyrate, ethyl valerate, methyl chloroacetate, ethyl dichloroacetate, methyl methacrylate, ethyl crotonate, ethyl cyclohexanecarbonate, methyl benzoate, ethyl benzoate, propyl benzoate, butyl benzoate, octyl benzoate, cyclohexyl benzoate, phenyl benzoate, benzyl benzoate, methy toluylate, ethyl toluylate, amyl toluylate, ethyl ethylbenzoate, methyl anisate, ethyl anisate, ethoxy ethylbenzate, γ-butyrolactone, δ-valerolactone, cumarin, phthalide, ethyl carbonate and the like, acid halides having from 2 to 15 carbon atoms, such as acetyl chloride, benzoyl chloride, toluic acid chloride, anisic acid chloride and the like, ethers having from 2 to 20 carbon atoms, such as methyl ether, ethyl ether, isopropyl ether, butyl ether, amyl ether, tetrahydrofuran, anisole, diphenyl ether and the like, acid anhydrides, such as acetic anhydride, phthalic anhydride, benzoic anhydride and the like, alkoxysilanes, such as ethyl silicate, diphenyldimethoxysilane and the like, acid amides, such as acetic N,N-dimethylamide, benzoic acid N,N-diethylamide, toluic acid N,N-dimethylamide and the like, amines, such as trimethylamine, triethylamine, tributylamine, tribenzylamine, tetramethylethylenediamine and the like, nitriles, such as acetonitrile, benzonitrile, trinitrile and the like, and pyridines, such as pyridine, methylpyridine, ethylpyridine, dimethylpyridine and the like.

In the preparation of the electron donor addition product of the soluble vanadium compound, the above-exemplified electron donors may be used singly or in combination of two or more kinds.

The organoaluminum compound (B) employable in the invention has an isobutyl group and a chlorine atom in its molecule, and is concretely represented by the following formula:

$(\text{i-Bu})_n \text{AlCl}_{3-n}$ wherein n is 1.0 to 2.5.

Examples of the organoaluminum compound (B) include Al(iso-butyl)Cl$_2$, Al(iso-butyl)$_{1.5}$Cl$_{1.5}$ and Al(iso-butyl)$_{2.0}$Cl.

In addition to the above compounds, organoaluminum compounds containing alkyl group other than isobutyl group and containing halogen other than chlorine may be used as the organoaluminum compound (B), with the proviso that the object of the invention is not marred.

The catalyst used in the invention is formed from the above-described soluble vanadium compound (A) and organoaluminum compound (B).

In the presence of such specific catalyst as mentioned above, ethylene (i) and the cycloolefin (ii) and if necessary α-olefin (iii) are copolymerized, whereby a cycloolefin random copolymer can be prepared in a high yield without being influenced by the polymerization temperature. The catalyst used in the invention shows high catalyst activity in the copolymerization of ethylene with cycloolefin, but the catalyst shows catalyst activity of only about equal level to that of conventionally known catalysts such as a catalyst formed from VO(OEt)Cl$_2$ and AlEt$_{1.5}$Cl$_{1.5}$ in the copolymerization of ethylene with propylene. This means that the polymerization catalyst used in the invention exhibits high catalyst activity specifically to the copolymerization of ethylene with cycloolefin. As described before, in the case where bulky cycloolefin is copolymerized with ethylene in accordance with the conventional process, there is a tendency that the catalyst activity is reduced when the temperature of the polymerization system is raised. In the process of the invention, however, a cycloolefin random copolymer can be prepared with high catalyst activity even if the temperature of the polymerization system is high. According to the invention, therefore, the polymerization temperature can be raised to decrease the viscosity of the polymerization system without reduction of the catalyst activity, whereby the copolymerization can be conducted with keeping the concentration of the polymerization system high and the composition thereof uniform. As a result, a copolymer of uniform composition can be prepared in a high yield. Further, polymerization reaction heat can be easily removed to effect economical advantage, and transportability of a polymerization liquid can be enhanced. Moreover, a copolymer of much higher molecular weight can be prepared owing to the above-mentioned various advantages.

In the process of the invention, the copolymerization is preferably conducted by a continuous method. In this case, a concentration of the soluble vanadium compound (A) in the polymerization system is usually in the range of 0.01 to 5 mmol/l, preferably 0.05 to 3 mmol/l. Further, it is desired that a concentration of the soluble vanadium compound (A) fed to the polymerization system is not more than 10 times, preferably in the range of 1 to 7 times, more preferably in the range of 1 to 5 times, of the concentration of the soluble vanadium compound (A) existing in the polymerization system. The organoaluminum compound (B) is fed to the polymerization system in such an amount that a ratio of the aluminum atom of the organoaluminum compound to the vanadium atom in the polymerization system Al/V) is 2 or more, preferably in the range of 2 to 50, more preferably in the range of 3 to 20.

The soluble vanadium compound (A) and the organoaluminum compound (B) are each diluted with the aforesaid hydrocarbon solvents and/or the cycloolefin (ii) of the liquid state, and fed to the polymerization system. The soluble vanadium compound (A) is desirably diluted to the above-mentioned concentration, while the organoaluminum compound (B) is desirably diluted so as to have a concentration of not more than 50 times of the concentration of the organoaluminum compound in the polymerization system and fed to the polymerization system.

The copolymerization of ethylene (i) and the cycloolefin (ii) and if necessary the α-olefin (iii) is carried out under the conditions of a temperature of usually 0° to 120° C., preferably 0° to 80° C, more preferably 0° to 60° C., and a pressure of usually more than 0 but not more than 50 kg/cm$^2$, preferably 1 to 20 kg/cm$^2$. A period of the reaction time (average retention time when the copolymerization is conducted by a continuous method) is usually in the range of 5 minutes to 5 hours, preferably 10 minutes to 3 hours, though varies depending on kind of the cycloolefin (ii), concentration of the catalyst, reaction conditions such as polymerization temperature, etc.

A chain transfer agent such as hydrogen may be further used for regulating molecular weight of the copolymer.

As described above, ethylene (i), the cycloolefin (ii) and if necessary the α-olefin (iii) are copolymerized with each other, and thereby a solution containing a cycloolefin random copolymer is obtained. In the solution thus obtained, the cycloolefin random copolymer is contained in a concentration of usually 10 to 500 g/l preferably 10 to 300 g/l. According to the process of the invention, the polymerization temperature can be set high without increasing a viscosity of the polymerization system, so that the upper limit of the copolymer concentration in the polymerization system is high.

The cycloolefin random copolymer obtained as above is amorphous or crystalline. Of these, amorphous copolymer which shows no DSC melting point and is determined by X-ray diffraction is preferred. The cycloolefin random copolymer has a glass transition point (Tg) of usually 0° to 240° C., preferably 20° to 200° C.

EFFECT OF THE INVENTION

According to the process for preparing a cycloolefin random copolymer of the invention, ethylene and specific bulky cycloolefin can be copolymerized with high catalyst activity independent of the polymerization temperature. Further, the polymerization temperature can be raised to decrease the viscosity of the polymerization system, and thereby the copolymerization can be conducted with keeping a concentration of the polymer in the polymerization system high and a composition thereof uniform. Hence, a copolymer of uniform composition can be prepared in a high yield. Moreover, removal of polymerization reaction heat can be easily made to effect economical advantage, and transportability of a polymerization liquid can be enhanced. In addition, in the case where a copolymer is prepared in a polymerization system having the same polymer concentration as that of the conventional system, the copolymer having much higher molecular weight can be easily prepared in this system.

The present invention is further illustrated by the following examples, but the invention is in no way limited to those examples.

EXAMPLE 1

Copolymerization reaction of ethylene with tetracyclo[4.4.0.1$^{2,5}$.1$^{7,10}$]-3-dodecene of the following formula (hereinafter abbreviated to TCD-3) was carried out continuously in the manner as mentioned below:

To a 1-liter reactor equipped with an agitating element is fed continuously through the upper portion thereof a cyclohexane solution of TCD-3 at a rate of 0.4 l/hr so that the concentration of TCD-3 in the reactor becomes 45 g/l. Further, to this reactor are fed continuously through the upper portion thereof a cyclohexane solution of VO(O t-butyl)Cl$_2$ at a rate of 0.5 l/hr (at that time the concentration of vanadium fed is 2.86 times that of the vanadium present in the reactor) so that the vanadium concentration in the reactor becomes 0.25 mmol/l and a cyclohexane solution of isobutylaluminum sesquichloride (Al(i-C$_4$H$_9$)$_{1.5}$Cl$_{1.5}$) at a rate of 0.4 l/hr so that the aluminum concentration in the reactor becomes 2.5 mmol/l, and cyclohexane at a rate of 0.7 l/hr. Furthermore, to the polymerization system are fed ethylene at a rate of 14.7 l/hr, nitrogen at a rate of 5.3 l/hr and hydrogen at a rate of 1.0 l/hr using a bubbling tube. The copolymerization reaction was carried out while maintaining the polymerization system at 30° C. by circulating a cooling medium through a jacket provided at the exterior of the reactor. The polymer solution containing an ethylene/TCD-3 random copolymer resulted from the above-mentioned copolymerization reaction was withdrawn continuously from the upper portion of the reactor so that the polymer solution present in the reactor becomes constantly 1 liter (i.e. so that an average retention time becomes 0.5 hour). To the polymer solution thus withdrawn was added a cyclohexane/isopropyl alcohol (1:1) mixed solution to terminate the polymerization reaction. Thereafter, an aqueous solution containing 1 liter of water and 5 ml of concentrated hydrochloric acid and the polymer solution were brought into contact with each other in the proportion of one to one with vigorous stirring by means of a homomixer, whereby the residual catalysts were allowed to migrate to an aqueous phase After allowing the thus contacted mixture to stand and removing the aqueous phase therefrom by separation, the polymer solution phase was then washed twice with distilled water.

After the polymer solution thus washed was brought into contact with vigorous stirring with acetone being 3 times as much as the polymer solution, a precipitated portion is collected by filtration, followed by thorough washing with acetone. The solids portion thus washed was poured into acetone at a concentration of 40 g/l followed by extraction operation at 60° C. for 2 hours, for extracting TCD-3 present in the polymer. After this extraction treatment, the solids portion was collected by filtration and dried for 24 hours under nitrogen flow at 130° C. and 350 mmHg.

In the manner mentioned above, an ethylene/TCD-3 copolymer was found to be obtained at a rate of 65.2 g/hr (i.e. 32.6 g/l).

In the copolymer thus obtained, an ethylene composition as measured by $^{13}$C-NMR analysis was 57.5 mol %, an intrinsic viscosity $[\eta]$ as measured in Decalin (decahydronaphthalene) at 135° C. was 0.45 dl/g, an iodine value was 1.0, and degree of crystallinity as measured by X-ray diffractometry was 0%.

Further, a glass transition temperature Tg as measured by DSC of the polymer at a heating rate of 10° C./min. was 149° C.

Furthermore, a melting point Tm of the polymer within a range of from −120° to 400° C. was measured at a heating rate of 10° C./mm by means of DSC (Type 990 of Du Pont), whereupon no endothermic peak due to crystalline was observed.

Results obtained are shown in Table 1.

EXAMPLES 2–4

The copolymerization reaction of ethylene and TCD-3 was carried out in each example in the same manner as in Example 1 except for the conditions as shown in Table 1.

Results obtained are shown in Table 1.

COMPARATIVE EXAMPLES 1–4

The copolymerization reaction of ethylene and TCD-3 was carried out in in each example in the same manner as in Example 1 except for the conditions as shown in Table 1.

Results obtained are shown in Table 1.

EXAMPLE 5

The same copolymerization reaction as in Example 1 was carried out except that in place of the TCD-3, there was used as the cycloolefin, 1,4-methano-1,4,4a,9a-tetrahydrofluorene (MTHF) which is a Diels-Adler reaction adduct of cyclopentadiene with indene.

Results obtained are shown in Table 1.

EXAMPLE 6

The same copolymerization reaction as in Example 1 was carried out except that in place of the TCD-3, there was used the cycloolefin, bicyclo[2.2.1]hept-2-ene (norbornene).

Results obtained are shown in Table 1.

TABLE 1

| | Vanadium Compound | Organo-aluminum Compound | Polymerization Temperature (°C.) | Amount of Gas Fed (l/hr) | | | Result | | | | |
|---|---|---|---|---|---|---|---|---|---|---|---|
| | | | | Ethylene | N$_2$ | H$_2$ | Yield (polymer concentration) (g/l) | Activity (g polymer/mmole V · 30 min) | Ethylene content (mol %) | $[\eta]$ (dl/g) | DSC-Tg (°C.) |
| Example 1 | VO(Ot-Bu)Cl$_2$ | AliBu$_{1.5}$Cl$_{1.5}$ | 30 | 14.7 | 5.3 | 1.0 | 32.6 | 130 | 57.5 | 0.45 | 149 |
| Example 2 | VO(Ot-Bu)Cl$_2$ | AliBu$_{1.5}$Cl$_{1.5}$ | 40 | 16.8 | 3.2 | 1.0 | 28.2 | 113 | 58.3 | 0.41 | 144 |
| Example 3 | VO(acac)$_2$ | AliBu$_{2.0}$Cl$_{1.0}$ | 30 | 14.7 | 5.3 | 1.0 | 29.9 | 120 | 59.0 | 0.50 | 142 |
| Example 4 | (V(acac)$_3$ | AliBu$_{2.0}$Cl$_{1.0}$ | 30 | 14.7 | 5.3 | 1.0 | 31.3 | 125 | 60.1 | 0.52 | 140 |
| Example 5 * | VO(Ot-Bu)Cl$_2$ | AliBu$_{1.5}$Cl$_{1.5}$ | 30 | 14.7 | 5.3 | 1.0 | 33.1 | 132 | 57.7 | 0.49 | 157 |
| Example 6 ** | VO(Ot-Bu)Cl$_2$ | AliBu$_{1.5}$Cl$_{1.5}$ | 30 | 14.7 | 5.3 | 1.0 | 36.3 | 145 | 57.3 | 0.71 | 101 |
| Comp. Example 1 | VO(OEt)Cl$_2$ | AlEt$_{1.5}$Cl$_{1.5}$ | 30 | 14.7 | 5.3 | 1.0 | 16.4 | 66 | 56.0 | 0.40 | 150 |
| Comp. Example 2 | VO(OEt)Cl$_2$ | AlEt$_{1.5}$Cl$_{1.5}$ | 40 | 16.8 | 3.2 | 1.0 | 9.7 | 39 | 57.3 | 0.33 | 149 |
| Comp. Example 3 | VO(OEt)Cl$_2$ | AlEt$_{1.5}$Cl$_{1.5}$ | 30 | 14.7 | 5.3 | 10 | 17.5 | 70 | 60.8 | 0.31 | 138 |
| Comp. Example 4 | VO(OEt)Cl$_2$ | AliBu$_{1.5}$Cl$_{1.5}$ | 30 | 14.7 | 5.3 | 10 | 15.1 | 60 | 62.3 | 0.29 | 135 |

*There was used 1,4-methano-1,4,4a,9a-tetrahydrofluorene (MTHF) as the cycloolefin.
**There was used bicyclo[2.2.1]hept-2-ene (norbornene) as the cycloolefin.

REFERENTIAL EXAMPLE 1

Ethylene/propylene copolymerization

A 1-liter separable flask thoroughly dried and equipped with an agitating element, a gas bubbling tube, a thermometer and a dropping funnel was thoroughly purged with nitrogen. This flask was charged with 250 ml of n-hexane dehydrated and dried by means of molecular sieves.

To the flask were fed, under a nitrogen atmosphere, VO(To-Bu)Cl$_2$ and Ali-Bu$_{1.5}$Cl$_{1.5}$ through the dropping funnel so that their concentrations in the system become 0.2 mmol/l and 2.0 mmol/l, respectively. Immediately thereafter, into the system were fed through the gas bubbling tube ethylene and propylene at rates of 90 l/hr and 210 l/hr, respectively, to initiate the polymerization reaction. The reaction was carried out at a temperature controlled to 30° C. for 10 minutes. The reaction was terminated by the addition of 3.0 ml of methanol to the system.

After the termination of the reaction, the polymer solution was poured into large amounts of methanol to precipitate the copolymer. The precipitated copolymer was washed with methanol, and vacuum dried at 60° C. overnight to obtain 3.9 g of the copolymer.

The ethylene composition in the copolymer as measured by $^{13}$C-NMR analysis was 58 mol %, and intrinsic viscosity as measured in decalin at 135° C. of the copolymer was 4.0 dl/g.

The results thus obtained are shown in Table 2.

REFERENTIAL EXAMPLE 2

The same ethylene/propylene copolymerization as in Referential Example 1 except that there were used as the catalysts $VO(OEt)Cl_2$ and $AlEt_{1.5}Cl_{1.5}$.

Results obtained are shown in Table 2.

TABLE 2

| | Catalyst system | Yield (g) | Ethylene content (mol %) | $[\eta]$ (dl/g) |
|---|---|---|---|---|
| Referential Example 1 | $VO(OtBu)Cl_2/$ $AliBu_{1.5}Cl_{1.5}$ | 3.9 | 58 | 4.0 |
| Referential Example 2 | $VO(OEt)Cl_2/$ $AlEt_{1.5}Cl_{1.5}$ | 4.2 | 59 | 3.8 |

As shown in Table 2, no remarkable difference in activity (yield) between the catalyst system (Referential Example 1) of the present invention and the prior art catalyst system (Referential Example 2) was observed so far as the ethylene/propylene copolymerization reaction is concerned.

What is claimed is:

1. A process for preparing a cycloolefin random copolymer, said copolymer comprising repeating units derived from (i) ethylene in an amount of 40 to 97% by mol, repeating units derived from (ii) at least one cycloolefin selected from cycloolefins represented by the following formula (I) or (II) in an amount of 3 to 60% by mol, and repeating units derived from (iii) α-olefin of 3-20 carbon atoms in an amount of 0 to 20% by mol;

characterized in that said process comprises copolymerizing (i) ethylene, (ii) at least one cycloolefin selected from cycloolefins represented by the following formula (I) or (II), and if necessary (iii) α-olefin of 3-20 carbon atoms, said copolymerization is carried out in a liquid phase in the presence of a catalyst formed from:

(A) a soluble vanadium compound having a tertiary alkoxy group or β-diketone as a ligand, and (B) an organoaluminum compound represented by the formula $(i\text{-}Bu)_nAlCl_{3-n}$ wherein n is 1.0 to 2.5:

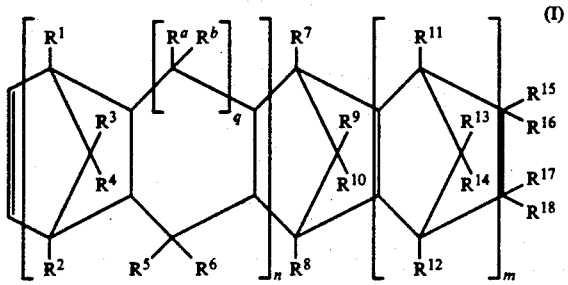

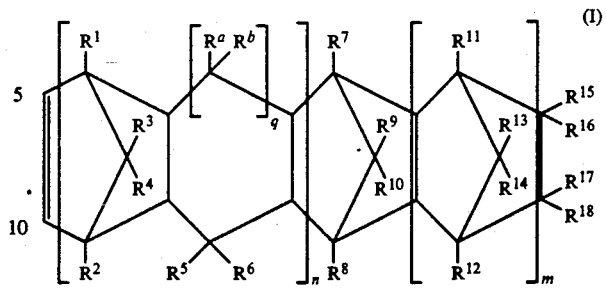

wherein n is 0 or 1; m is 0 or a positive integer; q is 0 of 1; $R^1$-$R^{18}$, $R^a$ and $R^b$ are each independently a hydrogen atom, a halogen atom or a hydrocarbon group; $R^{15}$-$R^{18}$ may be linked with one another to form a monocyclic or polycyclic group which may have a double bond; and $R^{15}$ and $R^{16}$, or $R^{17}$ and $R^{18}$ may together form an alkylidene group;

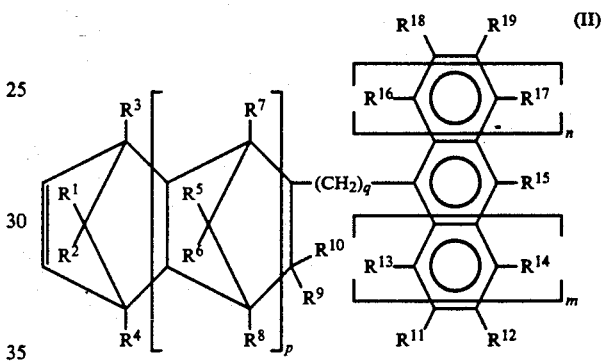

wherein each of p and q is independently 0 or an integer of 1 or more; each of m and n is independently 0, 1 or 2; $R^1$- $R^{19}$ are each independently a hydrogen atom, a halogen atom, an aliphatic hydrocarbon group, an alicyclic hydrocarbon group, an aromatic hydrocarbon group or an alkoxy group; a carbon atom to which $R^9$ and $R^{10}$ are linked may be bonded directly or by way of an alkylene group of 1-3 carbon atoms to a carbon atom to which $R^{13}$ is linked or a carbon atom to which $R^{11}$ is linked; and $R^{15}$ and $R^{12}$, or $R^{15}$ and $R^{19}$ may be linked together to form a monocyclic or polycyclic aromatic ring when each of n and m is 0.

2. The process as claimed in claim 1, wherein a concentration of the cycloolefin random copolymer in the liquid phase is in the range of 10 to 500 g/l.

3. The process as claimed in claim 1, wherein the copolymerization is conducted at a temperature of 0° to 120° C.

4. The process as claimed in claim 1, wherein an intrinsic viscosity $[\eta]$ of the cycloolefin random copolymer is in the range of 0.01 to 10 dl/g.

5. The process as claimed in claim 1, wherein the soluble vanadium compound (A) is $VO(To\text{-}Bu)Cl_2$, $VO(acetylacetonate)_2$ or $V(acetylacetonate)_3$.

6. The process as claimed in claim 1, wherein the soluble vanadium compound (A) is an electron donor addition product of $VO(To\text{-}Bu)Cl_2$, $VO(acetylacetonate)_2$ or $V(acetylacetonate)_3$.

7. The process as claimed in claim 1, wherein the cycloolefin is bicyclo[2.2.1]hept-2-ene, tetracyclo[4.4.0.1$^{2,5}$.1$^{7,10}$]-3-dodecene or 1,4-methano-1,4,4a,9a-tetrahydrofluorene.

* * * * *